Aug. 28, 1945.    A. MARCHAND    2,383,809
MIRROR RETAINING MEANS.
Filed Sept. 23, 1944
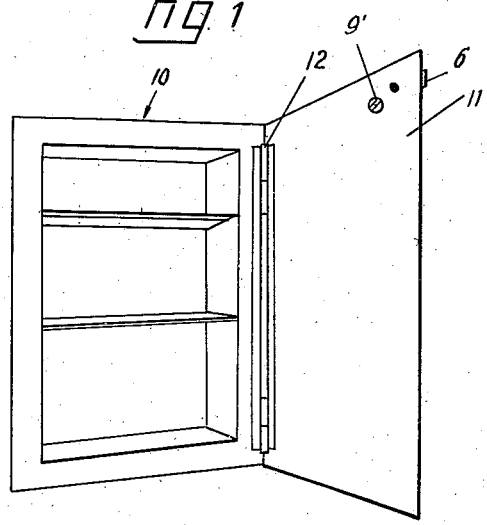
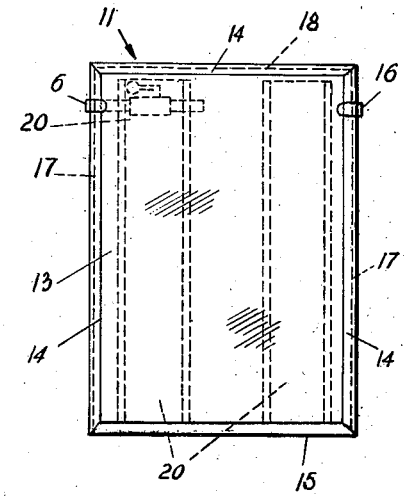
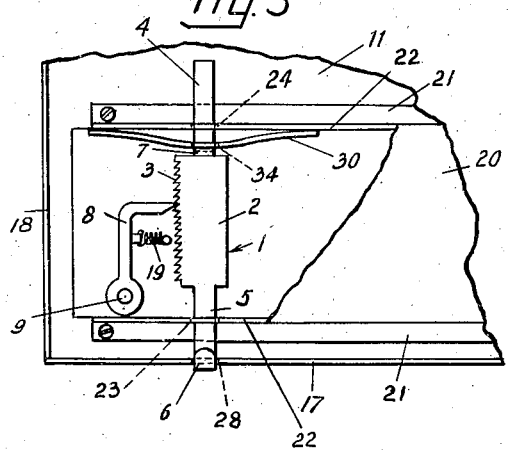
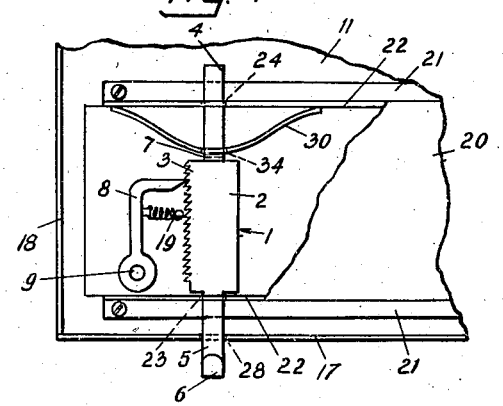
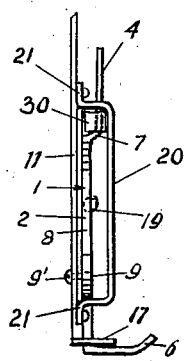
INVENTOR.
Adolph Marchand
BY W. Lee Helms
Attorney

Patented Aug. 28, 1945

2,383,809

UNITED STATES PATENT OFFICE 2,383,809

MIRROR RETAINING MEANS

Adolph Marchand, Jackson Heights, N. Y.

Application September 23, 1944, Serial No. 555,576

3 Claims. (Cl. 88—100)

This invention relates to means for retaining a mirror in position on the door of a medicine or similar cabinet. The object of the invention is to provide a mirror retaining means which shall be of simple construction, made of a few stamped parts which can be very cheaply made and assembled; which is readily manipulated to retain the mirror and readily manipulated so that the mirror may be removed. A further object is to provide a mirror retaining means which shall be reliable and hold the mirror in place at all times and under all conditions of use, and which cannot be accidentally or inadvertently released to free the mirror. A still further object is to provide a mirror retaining means which can be installed in the rather small clearance available in the cabinet door, and which will not increase the thickness of the mirror retaining means, which will not unduly encumber or impair the appearance of the mirrored cabinet door; more particularly, to provide a mirror retaining means which will present a minimum of its parts at the mirror front of the door (in the improved retaining means, this is merely a small clip which is hardly noticeable) and will present a minimum of parts at the inside face of the door (in the improved retaining means, this is merely a small screw-head which is hardly noticeable). For the attainment of the foregoing and such other objects of invention as may appear or be pointed out herein, I have shown an embodiment of my invention in the accompanying drawing, wherein:

Fig. 1 is a perspective view of a medicine cabinet with the mirrored door open and showing the inside face thereof;

Fig. 2 is a front view of the mirrored door of the cabinet;

Fig. 3 is a front view, enlarged, of the improved retaining means in holding position;

Fig. 4 is a front view similar to Fig. 3 but showing the retaining means in release position; and Fig. 5 is an end view of the improved retaining means.

The improved retaining means will be described herein in connection with a medicine cabinet, more particularly, with the door thereof and used for retaining a mirror to the front of the cabinet door. It will be evident, however, that the invention is in no way restricted to this particular use, but that it may be employed for retaining any type of plate or panel in place on a wall, or partition or door, whether forming part of a cabinet or walled surface. For example, the improved retaining means may be used for holding a mirror or other plate in place on a picture or on a partition or wall of a room, or on the door of a closet or room.

Merely for convenience the improved retaining means is shown in conjunction with a medicine chest or cabinet designated generally as 10 and provided with a front door 11 which is hinged to the cabinet at 12. The door has a mirror plate glass 13 affixed to its front. Mirror 13 usually has beveled edges 14. As shown in Fig. 2, mirror 13 is held in place by, and supported on, an inwardly-turned flange 15 along the bottom edge of door 11 which overlies part of the beveled edge 14 of the mirror, and by a stationary clip 16 near the top edge of the door and by a clip 6 which forms part of the improved retaining means at the opposite edge of the door and also near the top edge. The two side edges of the door are provided with plain flanges 17 and the top edge has a plain flange 18, these simply abutting against the back of the mirror and are hidden thereby.

The clip 6 of the improved mirror retaining means is adjustable between a holding position, shown in Figs. 2 and 3, close to the door 11 and mirror 13, and a releasing position, shown in Fig. 4, spaced from the door and mirror. To insert the mirror, adjustable clip 6 is first moved to releasing position, by means subsequently described, and the mirror slid into place from the top edge of the door having the plain flange 18 until its bottom edge is supported on the inwardly-turned flange 15. The adjustable clip 6 is then pushed inwardly, as will be more fully described, to holding position, thus retaining the mirror 13 in its proper vertical position relative to the door 11; in the latter position, the stationary clip 16 fits firmly against one edge of the mirror while the adjustable clip 6 fits firmly against the other edge thereof.

In the commonly used construction of mirrored cabinet doors, door 11 is fabricated from plate metal with flanges along its four sides, such as the afore-described inwardly-turned vertical flange 15 and the plain top flange 18 and the two side flanges 17. The plain flanges 17 and 18 extend a common distance from the metal plate of the door so that the mirror rests on the flanges near its top and side edges. To furnish a further support against which the mirror rests, a pair of vertical channeled strips 20 is secured to the door plate, as shown in Fig. 2. As more clearly shown in Figs. 3–4, and Fig. 5 in connection with the left strip, the channeled strips are formed of plate metal bent along their longitudinal edges to form a shallow channel and narrow longitudinal flanges 21. The strips are disposed vertically, Fig. 2, on door 11 and secured thereto by its flanges 21 which may be screwed or welded or otherwise secured to the door plate. The shallow channel is flush with the edges of the plain flanges 17 and 18, so that the mirror rests against the channeled strips 20 and on the edges of plain flanges 18 and 17.

The channeled strips 20, or rather, the left one, is made use of in the improved retaining means of this invention. The adjustable clip 6 forms an integral part of a slide member 1 which is punched out of sheet metal to the shape shown in Figs. 3-5, having a main portion 2 provided along one edge with ratchet teeth 3 and a narrow lower extension 5 and a narrow upper extension 4. The clip 6 is bent up at the end of the lower extension 5. Lower clip extension 5 slidably clears through a slot 23 provided in the lower wall 22 of the channeled strip 20 and through a slot 28 provided in the lower flange 17 of the door. The upper extension 4 is offset or bent outwardly or away from the door plate 11, the offset being designated 7. The purpose of offset 7 is to provide a shoulder or abutment for a flat spring 30. Flat spring 30 has a slot 34 through which the said offset upper extension 4 clears and is bent in arc-shape with its end portions resting against wall 22 of the channeled strip 20. The wall 22 of the channeled strip is provided with a slot 24 for the offset upper extension 4.

By reason of the interposition of spring 30 between the upper wall 22 of channeled strip 20 and the offset shoulder 7 of slide 1, the slide is urged by the spring in a downward direction to withdraw clip 6 away from the lower edge of door 11 and its mirror 13, as shown in Fig. 4. After properly positioning mirror 13 relative to the flanges of door 11, clip 6 is pushed inwardly or toward the door edge, to holding position, as shown in Fig. 3. To maintain clip 6 in holding or locking position (Fig. 3), a pawl 8 is pivotally mounted on door 11 as by a screw 9 and engaging with ratchet teeth 3 of the slide 1, being urged into engagement therewith by a coil spring 19. Screw 9 upon which the pawl 8 is pivotally mounted is secured to the pawl and has its slotted end 9; see Fig. 1, accessible from the inside of the door. Hence by applying a screw driver or the like to screw head 9; pawl 8 may be turned out of engagement with slide teeth 3, thus permitting spring 30 to move the slide and clip 6 to outward, releasing position.

I claim:

1. In a device of the class described, the combination of a supporting plate, a mirror to be mounted on the outer face of the said supporting plate, the said mirror and supporting plate being of substantially identical dimensions, the said supporting plate having outwardly projecting flanges along three sides and an inwardly-lipped flange along its fourth side, a long metal strip folded along both longitudinal edges to form a shallow channel having narrow flanges along both said longitudinal edges, the said channel strip being secured by its said longitudinal flanges to the outer face of the supporting plate with its longitudinal axis normal to the said lipped-flange edge of the supporting plate, the said mirror resting on the said three outwardly projecting flanges of the supporting plate and on the said channel strip with one edge underlying the said inwardly-lipped flange of the supporting plate, a clip having an inwardly-turned lip secured to one of the parallel projecting-flanged edges of the supporting plate near the third projecting-flanged edge, the parallel walls of the channel strip having a pair of aligned slots, a member having reduced extensions at both ends received in the said aligned slots to mount the said member for sliding movement in the said channel strip, the other of the said parallel projecting flanges of the supporting plate having a slot aligned with the said slots of the channel strip wherethrough one of the said slide extensions protrudes, the said protruded end of the slide extension having an inwardly-turned lip adapted to overlie the said mirror, the said slots and slide member being located near the said third projecting-flanged edge of the supporting plate and substantially opposite the said clip, the other of the said slide extension being offset to provide a shoulder, a flat spring provided with a slot for the said offset extension disposed between the wall of the channel strip and the said extension shoulder, said spring being adapted to urge the slide member in an outward direction to withdraw its lipped end from overlying relationship to the mirror, one edge of the said slide member being provided with ratchet teeth, and a pawl pivotally mounted on the said supporting plate and spring pressed into engagement with the said ratchet teeth of the slide to hold the slide against the said outward urgency of the spring with its said lipped end in overlying relation to the mirror, the said pawl mounting being secured to the pawl and having a part accessible from the inside face of the supporting plate.

2. In a device of the class described, the combination of a supporting plate, a mirror to be mounted on the outer face of the said supporting plate, the said mirror and supporting plate being of substantially identical dimensions, the said supporting plate having outwardly projecting flanges along three sides and an inwardly-lipped flange along its fourth side, a long metal strip folded along both longitudinal edges to form a shallow channel secured to the outer face of the supporting plate with its longitudinal axis normal to the said lipped-flange edge of the supporting plate, the said mirror resting on the said three outwardly projecting flanges of the supporting plate and on the said channel strip with one edge underlying the said inwardly-lipped flange of the supporting plate, a clip having an inwardly-turned lip secured to one of the parallel projecting-flanged edges of the supporting plate near the third projecting-flanged edge, the parallel walls of the channel strip having a pair of aligned slots, a member slidably mounted in the said aligned slots of the said channel strip, the other of the said parallel projecting flanges of the supporting plate having a slot aligned with the said slots of the channel strip wherethrough one end of the said slide member protrudes, the said protruded end of the slide member having an inwardly turned lip adapted to overlie the said mirror, the said slots and slide member being located near the said third projecting-flanged edge of the supporting plate and substantially opposite the said clip, the other end of the said slide member being offset to provide a shoulder, a flat spring provided with a slot for the said offset end of the slide member disposed between the wall of the channel strip and the said shoulder, said spring being adapted to urge the slide member in an outward direction to withdraw its lipped end from overlying relationship to the outer slab, one edge of the said slide member being provided with ratchet teeth and a pawl pivotally mounted on the said supporting plate and spring pressed into engagement with the said ratchet teeth of the slide to hold the slide against the said outward urgency of the spring with its said lipped end in overlying relation to the mirror, the said pawl mounting being secured to the pawl and having a part accessible from the inside face of the supporting plate.

3. In a device of the class described, the combination of a supporting plate, a mirror to be mounted on the outer face of the said supporting plate, the said mirror and supporting plate being of substantially identical dimensions, the said supporting plate having outwardly projecting flanges along three sides and an inwardly-lipped flange along its fourth side, a long metal strip folded along both longitudinal edges to form a shallow channel secured to the outer face of the supporting plate with its longitudinal axis normal to the said lipped-flange edge of the supporting plate, the said mirror resting on the said three outwardly projecting flanges of the supporting plate and on the said channel strip with one edge underlying the said inwardly-lipped flange of the supporting plate, a clip having an inwardly-turned lip secured to one of the parallel projecting-flanged edges of the supporting plate near the third projecting-flanged edge, a member mounted for sliding movement in the said channel strip with one end protruding through the other of the said parallel projecting flanges of the supporting member, the said protruded end of the slide member having an inwardly-turned lip adapted to overlie the said mirror, the said slide member being located near the said third projecting-flanged edge of the supporting plate and substantially opposite the said clip, a flat spring abutting the wall of the channel strip and adapted to urge the slide member in an outward direction to withdraw its lipped end from overlying relationship to the outer slab, one edge of the said slide member being provided with ratchet teeth, a pawl pivotally mounted on the said supporting plate and spring pressed into engagement with the said ratchet teeth of the slide to hold the slide against the said outward urgency of the spring with its said lipped end in overlying relation to the mirror, the said pawl mounting being secured to the pawl and having a part accessible from the inside face of the supporting plate.

ADOLPH MARCHAND.